(12) United States Patent
Boling et al.

(10) Patent No.: US 7,994,747 B2
(45) Date of Patent: Aug. 9, 2011

(54) SUPPRESSING PHASED MOTOR VOLTAGE TRANSIENTS ON DISCONNECT

(75) Inventors: Brian Dean Boling, Lafayette, CO (US); Michael Ernest Dickeson, Westminster, CO (US); Frank P. Domingo, Jr., Arvada, CO (US)

(73) Assignee: Seagate Technology LLC, Cupertino, CA (US)

( * ) Notice: Subject to any disclaimer, the term of this patent is extended or adjusted under 35 U.S.C. 154(b) by 731 days.

(21) Appl. No.: 11/777,897

(22) Filed: Jul. 13, 2007

(65) Prior Publication Data

US 2009/0015186 A1 Jan. 15, 2009

(51) Int. Cl.
*H02H 7/09* (2006.01)

(52) U.S. Cl. ....... 318/400.22; 361/23; 361/43; 361/111; 363/56.12; 323/276

(58) Field of Classification Search ............. 318/400.01, 318/400.27, 430, 362, 507, 700, 400.36, 318/400.21, 400.22, 783; 324/765; 360/323; 361/23, 43, 56, 65, 199, 111; 257/479, 487, 257/603; 417/44.1; 323/276; 363/56.12
See application file for complete search history.

(56) References Cited

U.S. PATENT DOCUMENTS

| | | | |
|---|---|---|---|
| 3,780,363 A * | 12/1973 | Doemen et al. ............... | 318/688 |
| 3,974,430 A | 8/1976 | Tyler et al. | |
| 4,060,757 A | 11/1977 | McMurray | |
| 4,209,738 A | 6/1980 | Nuver et al. | |
| 4,640,389 A | 2/1987 | Kamaike | |
| 4,922,169 A | 5/1990 | Freeman | |
| 5,210,474 A | 5/1993 | Oswald | |
| 5,221,881 A | 6/1993 | Cameron | |
| 5,300,870 A | 4/1994 | Smith | |
| 5,306,988 A | 4/1994 | Carobolante et al. | |
| 5,514,939 A * | 5/1996 | Schlager et al. ......... | 318/400.09 |
| 5,550,446 A * | 8/1996 | Schlager et al. ......... | 318/400.19 |
| 5,572,096 A * | 11/1996 | Schlager .................. | 318/400.27 |
| 5,646,810 A | 7/1997 | Funke | |
| 5,661,384 A | 8/1997 | Glibbery | |
| 5,723,915 A | 3/1998 | Maher et al. | |
| 5,946,177 A * | 8/1999 | Miller et al. ..................... | 361/56 |
| 5,947,691 A * | 9/1999 | Brown et al. ................ | 417/44.1 |
| 5,986,493 A * | 11/1999 | Li ................................. | 327/328 |
| 5,990,640 A | 11/1999 | Dwyer et al. | |

(Continued)

FOREIGN PATENT DOCUMENTS

EP 1624570 * 2/2008

OTHER PUBLICATIONS

Floyd, Electronic Devices, 1996, Prentice-Hall,Inc., Fourth Edition, pp. 36,452.*

*Primary Examiner* — Walter Benson
*Assistant Examiner* — Antony M Paul
(74) *Attorney, Agent, or Firm* — David K. Lucente

(57) ABSTRACT

A clamping circuit is included in a phased motor control circuit, particularly on an electrical connection connected to at least one electrostatic discharge cell and/or the driver control electronics of the phased motor control circuit. The clamping circuit triggers when a voltage that exceeds a clamping turn-on threshold occurs on the electrical connector, sourcing or sinking the discharge current so as to protect the electrostatic discharge cells and/or driver control electronics from destruction by said discharge current.

21 Claims, 6 Drawing Sheets

U.S. PATENT DOCUMENTS

Figure 1:
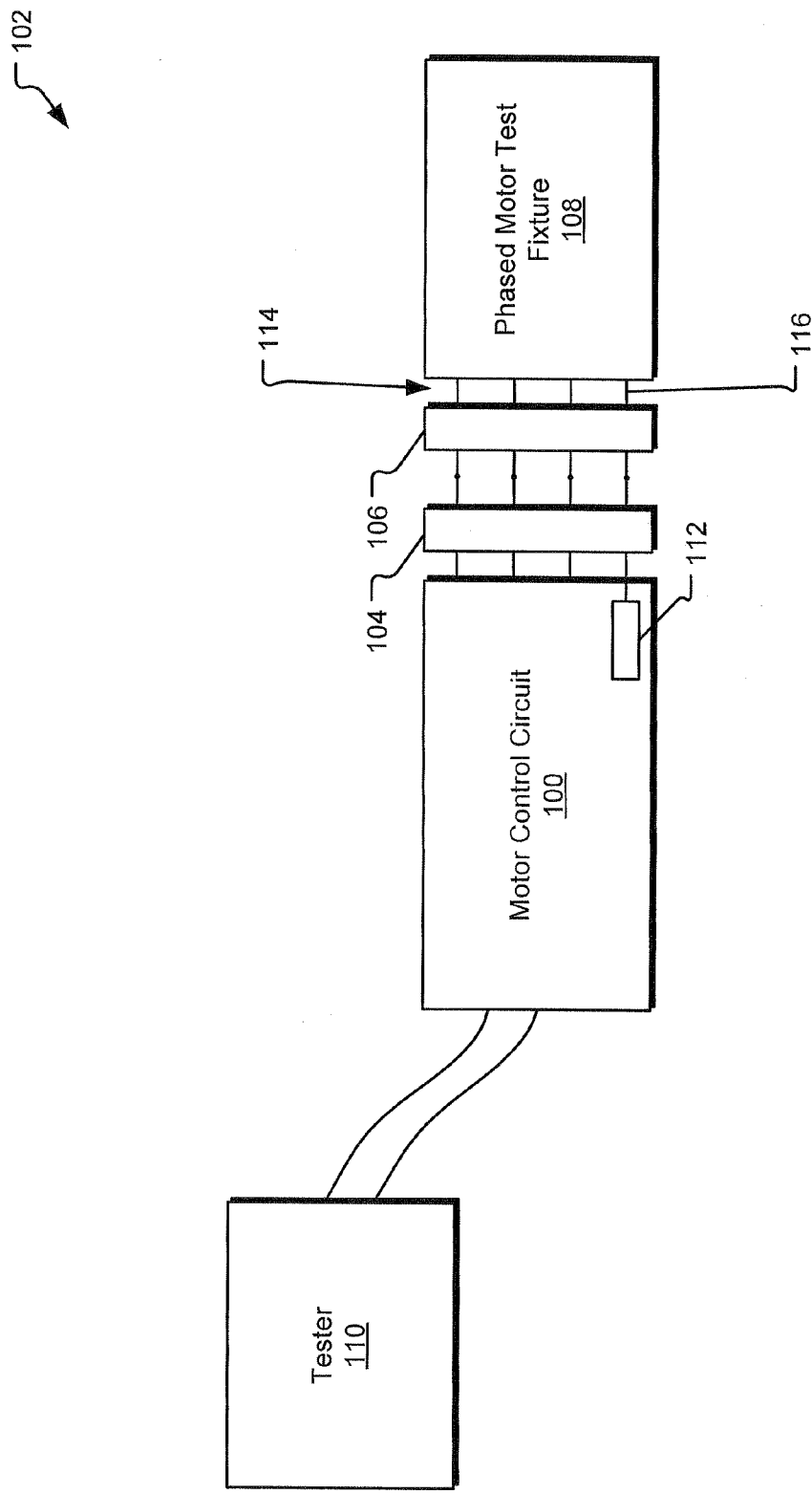

| | | | |
|---|---|---|---|
| 5,998,833 A * | 12/1999 | Baliga | 257/329 |
| 6,198,611 B1 | 3/2001 | Macbeth | |
| 6,333,604 B1 * | 12/2001 | Robb | 315/209 R |
| 6,549,361 B1 * | 4/2003 | Bennett et al. | 360/75 |
| 6,577,465 B1 * | 6/2003 | Bennett et al. | 360/69 |
| 6,614,633 B1 * | 9/2003 | Kohno | 361/56 |
| 6,710,983 B2 * | 3/2004 | Voldman | 360/323 |
| 6,870,144 B2 * | 3/2005 | Ryu et al. | 219/626 |
| 6,900,998 B2 * | 5/2005 | Erickson et al. | 363/159 |
| 6,934,135 B1 | 8/2005 | Ryan | |
| 7,006,320 B1 * | 2/2006 | Bennett et al. | 360/73.03 |
| 7,034,478 B2 | 4/2006 | Bhaumik et al. | |
| 7,161,772 B2 * | 1/2007 | Iben | 360/323 |
| 7,656,009 B2 * | 2/2010 | Gerstenhaber et al. | 257/541 |
| 2004/0105664 A1 * | 6/2004 | Ivankovic | 388/800 |
| 2007/0165345 A1 * | 7/2007 | Woo | 361/56 |
| 2007/0253128 A1 * | 11/2007 | Tiebout et al. | 361/56 |
| 2008/0246345 A1 * | 10/2008 | Zecri et al. | 307/413 |

* cited by examiner

SUPPRESSING PHASED MOTOR VOLTAGE TRANSIENTS ON DISCONNECT

SUMMARY

Some storage devices, such as magnetic and optical disc drives, have three-phased spindle motors that spin one or more magnetic or optical discs during operation. Phased motors may be controlled by a motor control circuit assembled upon a printed circuit board (PCB). As part of the manufacturing process, a motor control circuit is typically tested using a test fixture that includes a phased motor. In one implementation, the motor control circuit is connected to the phased motor of the test fixture and run through a sequence of computer or firmware controlled tests, which include manipulating phase voltages used to control the rotation of the test fixture's phased motor.

At the completion of a motor control circuit test, the phased motor will spin down (with or without braking) and eventually stop its rotation. However, during spin down with braking, the phased motor of the test fixture can still generate voltage across the motor windings from back EMF (electromotive force), resulting in potentially large phase currents flowing through the motor windings. If the motor control circuit is disconnected from the test fixture during spin down, these large currents can discharge through to the motor control circuit and fatally damage its components. In particular, if a centertap connection of the phased motor is disconnected last, the discharge current from the motor windings can destroy various components of the motor control circuit. Accordingly, unless the motor control circuit can be protected from such discharges, the motor control circuit can test successfully, only to be damaged thereafter when it is disconnected from the test fixture.

Implementations described and claimed herein address the foregoing problems by adding a clamping circuit to a phased motor control circuit. By connecting the clamping circuit to a tap of a phased motor, one or more electrostatic discharge cells and the driver control electronics that are also connected to the tap are isolated from possible back EMF-induced discharge current that could otherwise damage them. The clamping circuit triggers when a voltage that exceeds a clamping turn-on threshold of the clamping circuit occurs on the electrical connection corresponding to the tap, sourcing or sinking the discharge current through the clamping circuit so as to protect the electrostatic discharge cells and/or driver control electronics from destruction by said discharge current.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. It should also be understood that, although disc drive implementations are described here, the described technology may be applied to other systems.

BRIEF DESCRIPTIONS OF THE DRAWINGS

Figure 2:
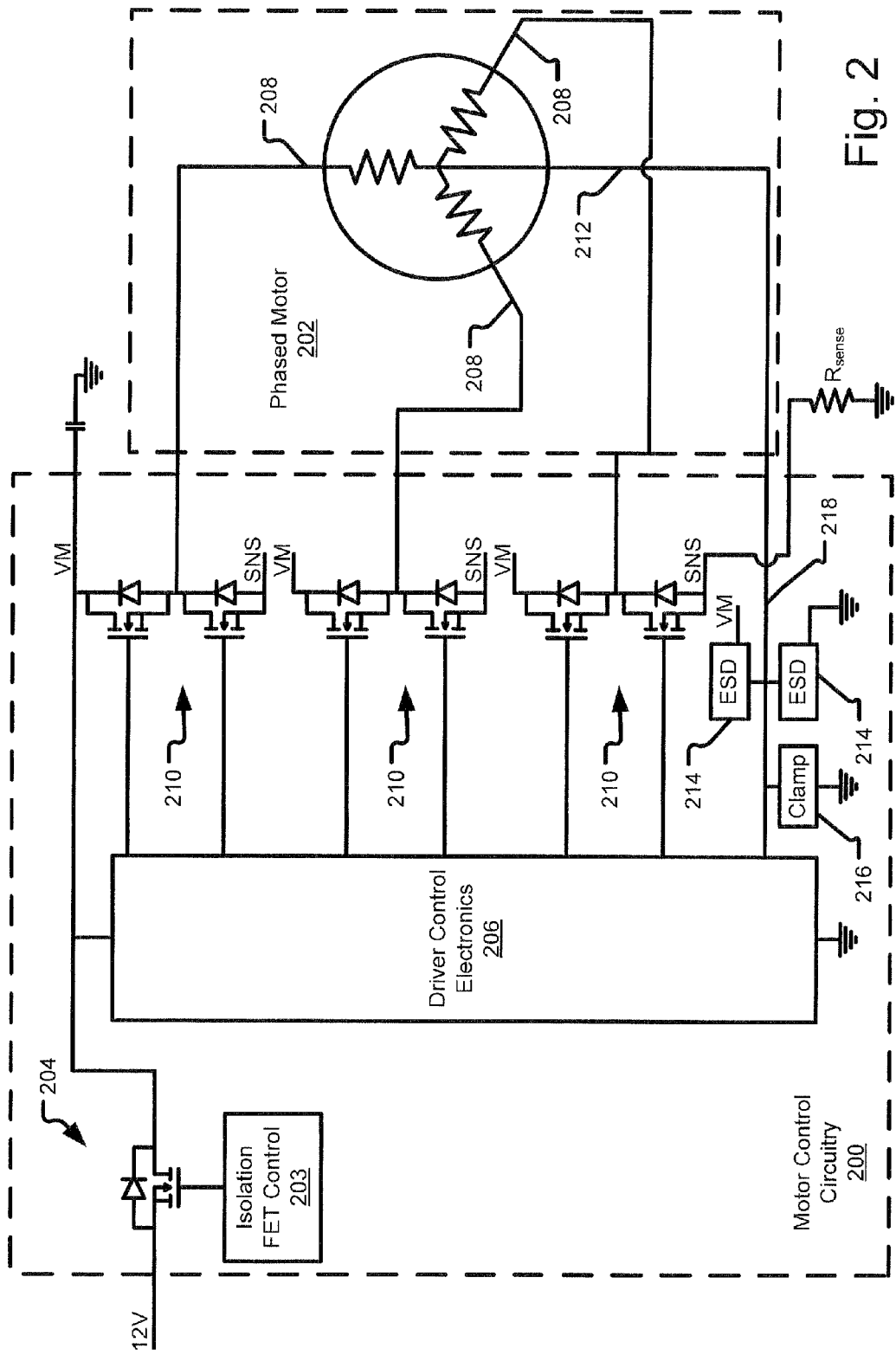
Figure 3:
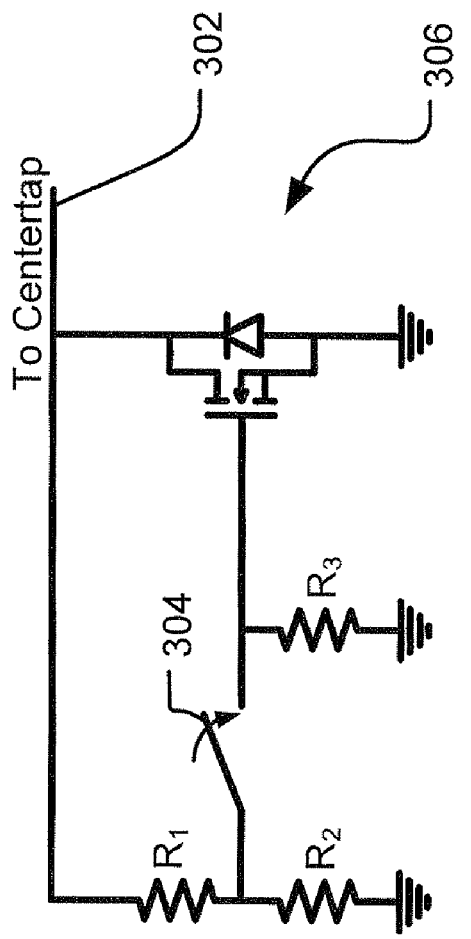
Figure 4:
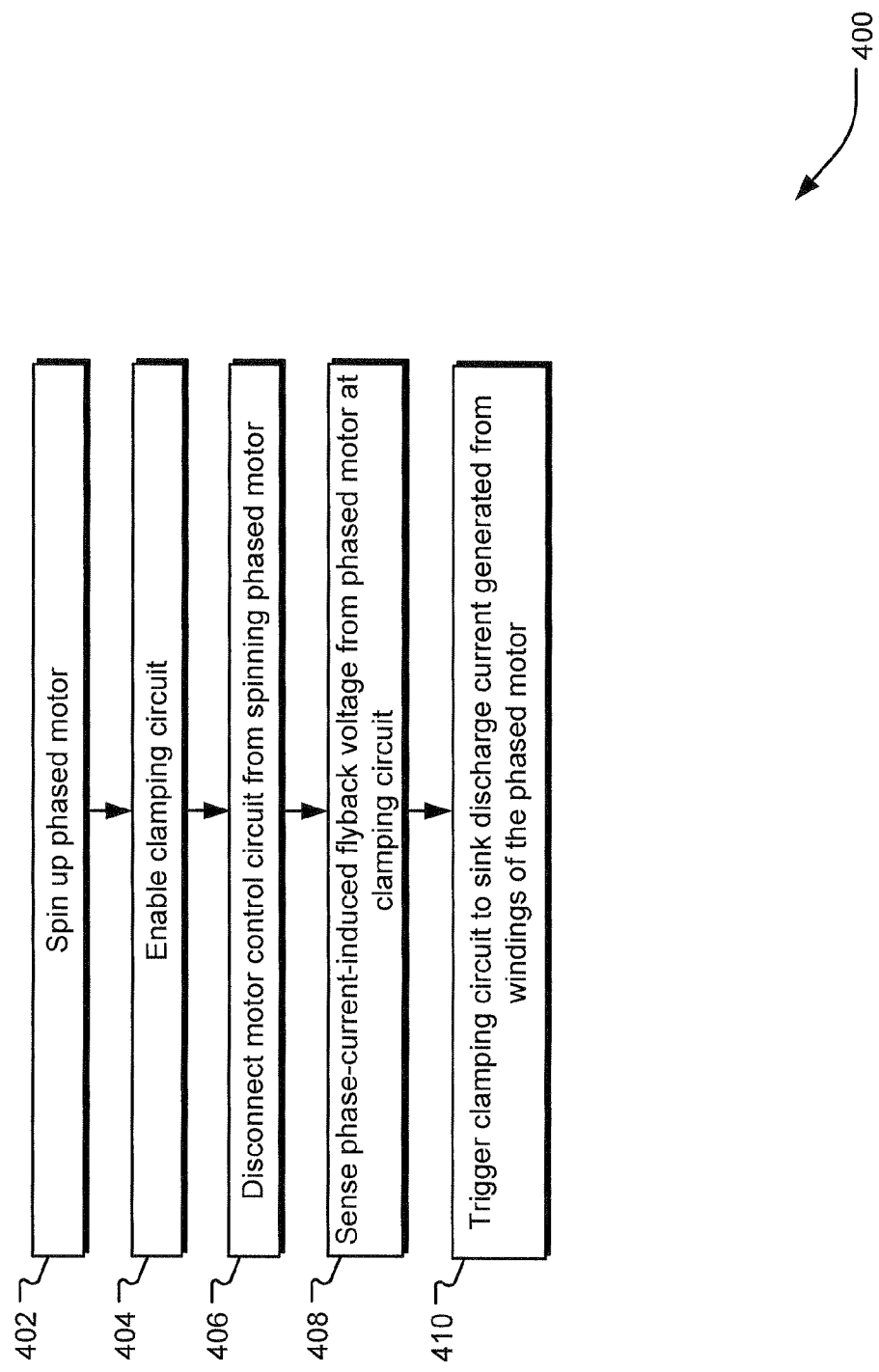
Figure 5:
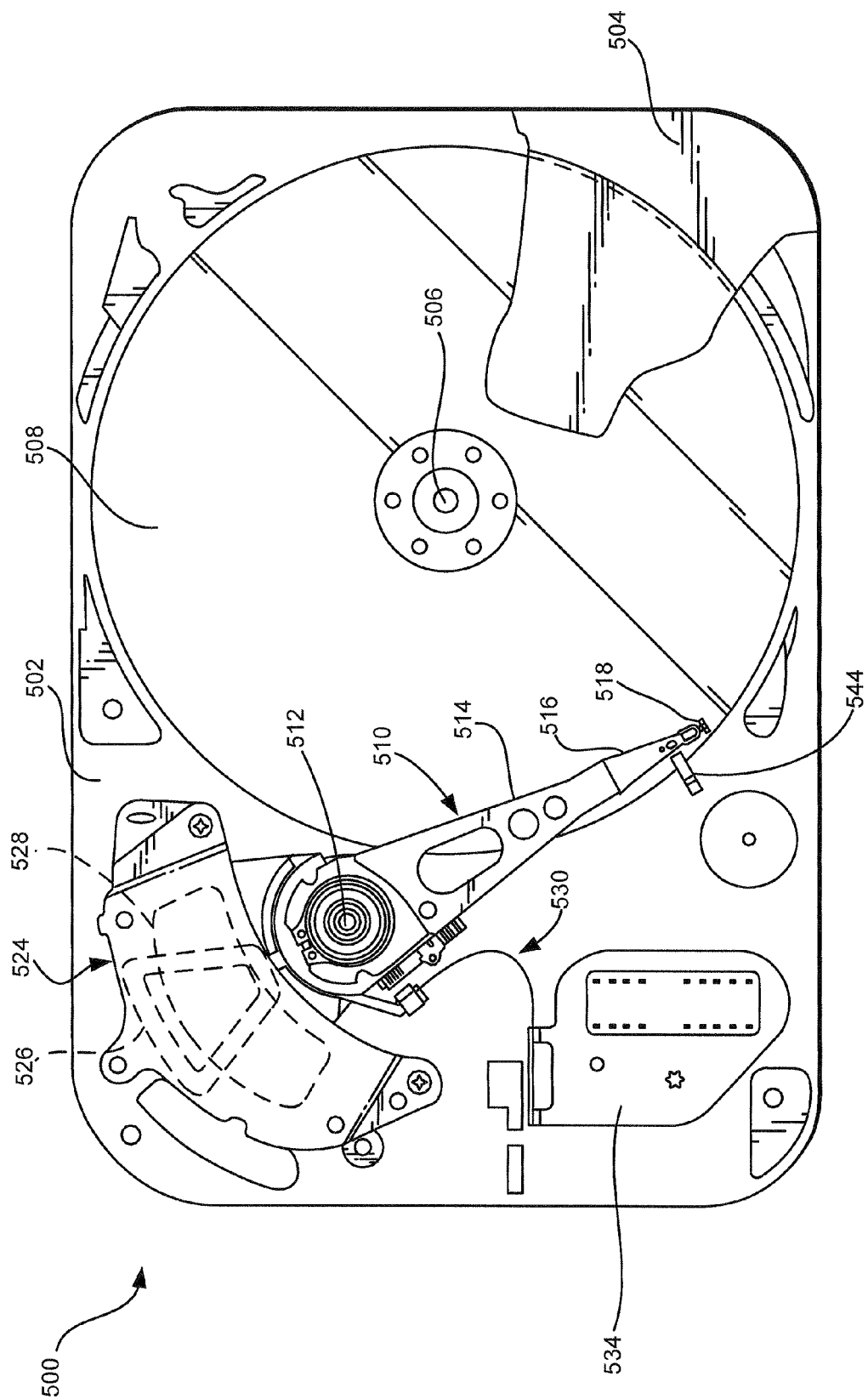
Figure 6:
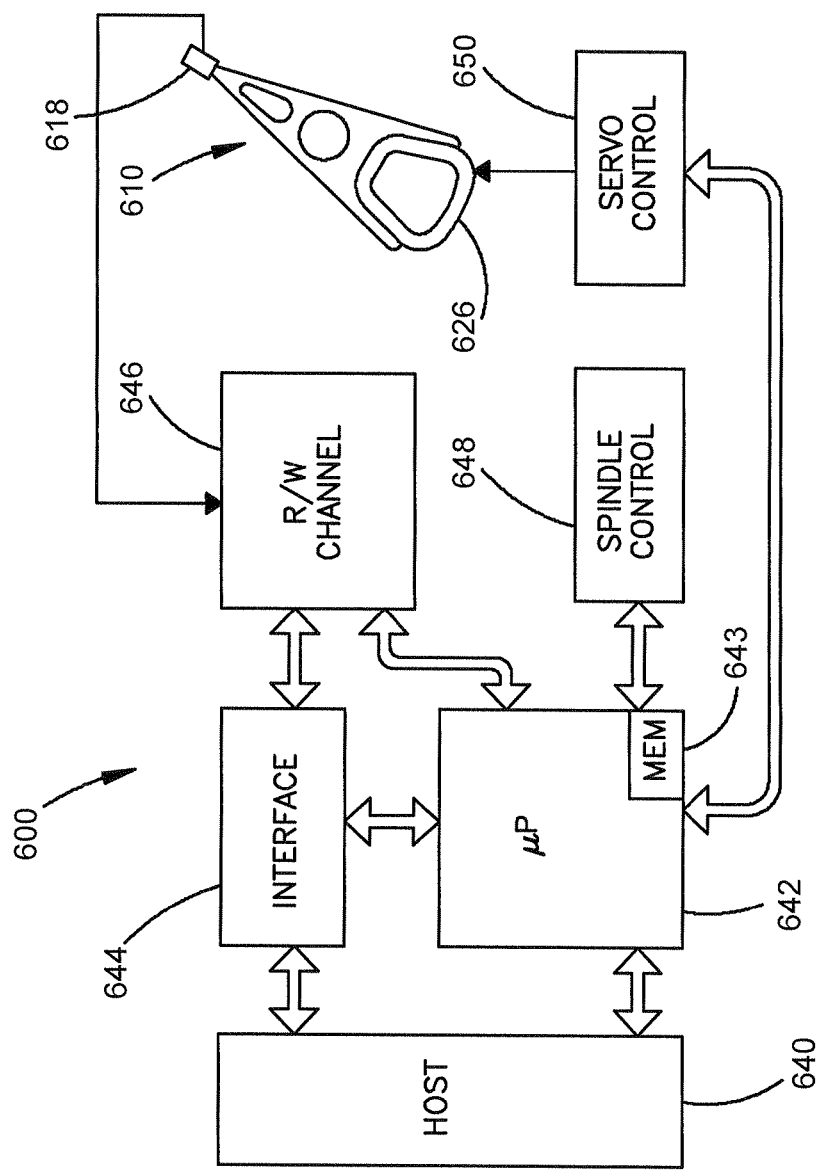

FIG. 1 illustrates an exemplary motor control circuit in a testing configuration.
FIG. 2 illustrates components of an exemplary motor control circuit.
FIG. 3 illustrates an example clamping circuit.
FIG. 4 illustrates example operations for sinking discharge current from windings of a phased motor.
FIG. 5 illustrates a plan view of an example disc drive.
FIG. 6 illustrates the example functional components of a disc drive.

DETAILED DESCRIPTIONS

A disc drive is a data storage device used to store digital data. A typical disc drive includes a number of rotatable recording discs (i.e., storage medium discs) that are axially aligned and mounted to a spindle motor for rotation at a high rotational velocity. A corresponding array of read/write heads access tracks defined on the respective disc surfaces to write data to and read data from the discs. Although certain implementations are described herein in the context of disc drives, the described technology may be employed in other non-disc-drive systems as well.

One implementation of the described technology introduces a clamping circuit into a phased motor control circuit, particularly on an electrical connection connected to one or more electrostatic discharge cells and/or the driver control electronics of the phased motor control circuit. The clamping circuit triggers when a voltage that exceeds a clamping turn-on threshold occurs on the electrical connector, sourcing or sinking the discharge current so as to protect the electrostatic discharge cells and/or driver control electronics from destruction by said discharge current.

FIG. 1 illustrates an exemplary motor control circuit 100 in a testing configuration 102. The motor control circuit 100 represents a device under test (DUT) that is connected via electrical connectors 104 and 106 to a phased motor test fixture 108, which includes a phased motor (not shown). In the illustrated implementation, a tester 110 is connected to the motor control circuit 100 to issue test commands and receive test results detected in response to said test commands. The phased motor test fixture 108 in the illustrated example includes four electrical connections for each tap of a three phase spindle motor, including a tap for each phase winding or coil 114 and a centertap 116, although it should be understood that other configurations may be employed for other types of phased motors (e.g., motors having more than three phases, motors lacking center taps, etc.).

The electrical connection 116 for the center tap is coupled through the electrical connectors 104 and 106 to a clamping circuit 112 of the motor control circuit 100. In one implementation, the clamping circuit 112 and electrical connection 116 are also coupled to one or more electrostatic discharge cells and the driver control electronics of the motor control circuit.

In one scenario, the motor control circuitry 100 is tested by the tester 100 using the phased motor test fixture 108. After completion of the test, disconnecting the electrical connector 104 from the electrical connector 106 while the phased motor is still spinning can result in current from phased motor windings to be discharged through the motor control circuitry 100, potentially destroying electronic components therein. This discharge is most likely to occur when the centertap connection 116 is not disconnected before one or more of the other windings connections 114, although other disconnection sequences may result in a similar damaging discharge. In the illustrated example, the electrical connection of the motor control circuit 100 that is coupled to the centertap connection 116 is manufactured with a clamping circuit 112 to protect connected electrostatic discharge cells and/or driver control electronics of the motor control circuit 100.

FIG. 2 illustrates components of exemplary motor control circuit 200. The motor control circuit 200 is coupled to an example phased motor 202. Intermediate electrical connectors are not shown but are positioned between the motor control circuit 200 and the phased motor 202 to allow the connection and disconnection of the motor control circuit 200 and the phased motor 202. An isolation device 204 is turned on by an isolation FET control circuit 203 under normal operation to provide a low impedance path between a power supply (e.g., a 12 volt power supply) and driver control electronics 206.

Each tap 208 of the phased motor 202 is coupled to a bridge stage 210 including a pair of three-phase bridge FETs (Field Effect Transistors). When the phased motor 202 is being powered to spin, driver control electronics 206 drive the bridge stages 210 in a manner that maintains proper spin rotation direction and speed of the phased motor 202. A centertap 212 is used to sense zero crossings of the individual phase voltage back EMF waveforms and carries very small currents under normal operating conditions. Electrostatic discharge cells 214 are incorporated within the motor control circuit 200 to protect the driver control electronics 206 against high voltage, low energy electrostatic discharge events received through the centertap connection during the manufacturing process as well as in the end application.

When power is lost (e.g., turned off after completion of motor control circuit testing), the isolation device 204 turns off and the mechanical energy stored in the phased motor 202 is used to complete any shutdown actions for the phased motor (e.g., retracting a recording head in a disc drive, etc.). Upon completion of any shutdown actions, a dynamic braking condition may be initiated, with each low side power transistors (e.g., those connected to SNS, representing a low side current sense resistor) being turned on. A high phase current, defined by back EMF voltage and phase resistance, is generated in each winding of the phased motor 202 when the dynamic braking is initiated. The phase current decays exponentially to zero as the back EMF amplitude reduces with the diminishing motor rotational velocity.

A clamping circuit 216 is connected to an electrical connection 218, which is also connected to the driver control electronics 206, the electrostatic discharge cells 214, and the electrical connector (not shown) that is adapted to couple to the centertap 212 of the phased motor 202. The clamping circuit 217 is designed to turn on at a voltage threshold (i.e., a turn-on threshold) that is lower in magnitude than the turn-on thresholds of the electrostatic discharge devices 214. In addition, the clamping circuit 216 is designed to turn on at a voltage threshold that is lower in magnitude than the breakdown voltage of the driver control electronics 206. For example, in the case of a positive peak current (i.e., current flowing from a discharging phased motor winding), the inductive flyback transient current is also positive and is clamped down by the clamping circuit 216 if the voltage on the electrical connection corresponding to the centertap 212 exceeds the threshold of the clamping circuit 216. In this manner, the clamping circuit 216 sinks the discharge current rather than allowing the current to flow through the electrostatic discharge cells 214 and/or the driver control electronics 206.

In one implementation, the multiplicative product of the maximum anticipated discharge current and clamp impedance (wherein the product represents the turn-on threshold voltage for the clamping circuit 216 in positive discharge current conditions) should be lower in magnitude than the turn-on threshold voltage of the electrostatic discharge cells 214 and the breakdown voltage of the driver control electronics 206. Safety margins may also be introduced to turn-on threshold of the clamping circuit 216 to ensure that the clamping circuit 216 turns on before the electrostatic discharge cells 214 and prior to breakdown of the driver control electronics 206. An example turn-on threshold of the clamping circuit 216 is based on a maximum clamp resistance of 2 ohms, although other clamp resistances may be employed. In one implementation, a maximum discharge current of 3 amps is anticipated, yielding a clamp voltage of approximately 6 volts, although other parameters may yield different clamp voltages in the positive current condition.

In the case of a negative peak current (i.e., current flowing to the discharging phased motor winding), the inductive transient current is negative and is clamped by the clamping circuit 216 (e.g., by a FET body diode or a separate diode in the case of a clamping circuit employing a bipolar transistor). in one implementation, the diode threshold voltage is lower in magnitude than the negative electrostatic discharge cell threshold to cause the diode to turn on before an electrostatic discharge cell. In one implementation, the negative electrostatic discharge cell threshold may be the substrate forward bias voltage of the driver control electronics. An example diode turn-on threshold voltage is on the order of 1 volt, although other turn-on threshold voltages may be employed.

Furthermore, the clamping circuit 216 is designed to be capable of sourcing or sinking discharge current that is expected to be generated. In this manner, the clamping circuit 216 carries the excessive discharge current flowing, if at all, through the centertap 212, thereby protecting the electrostatic discharge devices 214 and the driver control electronics 206 from said discharge current. In one implementation, the maximum anticipated discharge current is ±3 amps, so the clamping circuit 216 is designed to sink at least ±3 amps, possibly with the addition of a safety margin (e.g., ±4 amps).

FIG. 3 illustrates an example clamping circuit 300. An electrical connection 302 is adapted to be connected to driver control electronics (not shown), one or more electrostatic discharge cells (not shown) and an electrical connector to a centertap of a phased motor (not shown). Under normal operating conditions, a switch 304 is open and the clamping circuit 300 is disabled from carrying current through the electrical connection 302. At power loss, the switch 304 closes, enabling the clamping circuit 300 to sink current from the electrical connection 302, provided the voltage on the electrical connection 302 exceeds (in magnitude) the turn-on voltage of either the FET 306 or the body diode of the FET 306. Resistors R1 and R2 set the clamping circuit threshold voltage at which the clamping circuit 300 engages. The resistor R3 ensures the clamping circuit 300 remains disabled during normal operation.

In one implementation, under power loss conditions, the switch between R2 and R3 is closed and voltage at the gate of the clamping FET is defined by the relationship $$V_{gate} = V_{centertap}\left(\frac{R2\|R3}{R1 + R2\|R3}\right),$$

where the operator "$\|$" indicates the equivalent resistance of the two parallel resistances in the operands. R3 is assumed to be large in relation to R2, resulting in an approximate relationship $$V_{gate} = V_{centertap}\left(\frac{R2}{R1 + R2}\right).$$

Resistor values R1 and R2 are chosen such that the FET turns on when $V_{centertap}$ reaches the desired turn-on threshold. As a specific numeric example, assume a desired center tap clamping voltage is $V_{centertap}$=10 volts and the FET gate-source threshold voltage is $V_{gate}$=2 volts. Then, R1≈4*R2 when these voltages are used in the approximate relationship described above. In a typical configuration, resistors R1 and R2 may be chosen to be in the tens to hundreds of Ohms range, while R3 may be chosen in the tens of KOhms range.

In one implementation, a clamping circuit having the following parameters is employed to successfully clamp phased motor transients upon disconnect to between +10 V and −0.5 V, although other configurations may be employed:
  a switch with a two ohm on resistance
  R1 set to 10 kΩ
  R2 and R3 set in parallel combination to 1 Ω
  an N-channel MOSFET having a body diode with similar characteristics of a 1N5817 Schottky diode In an alternative implementation, a physical Schottky diode may be used in parallel with the FET body diode, because the FET body diode may exhibit a excessive forward voltage drop at anticipated current levels. Other implementations may include a bipolar transistor and separate diode or some other clamping circuit configuration, instead of the FET-based circuit shown.

It should also be understood that the timing control of the clamping circuit works together with the clamping threshold and the clamping circuit impedance. The resistor R1 and R2 are chosen with an understanding of the turn-on characteristics of the particular clamping circuit configuration, whether FET-based or bipolar-transistor-based). In addition to the threshold considerations, the clamping circuit is designed to engage temporally before the center tap voltage exceeds either the ESD cell threshold voltage or the driver control electronics breakdown voltage, whichever is lower. In this manner, the clamping circuit sinks or sources the excessive current without damaging the ESD cells or the driver control electronics.

FIG. 4 illustrates example operations 400 for sinking discharge current from windings of a phased motor. A spinning operation 402 spins up a phased motor. In one implementation, the spinning operation 402 may be part of a testing operation in which a motor control circuit executes a series of commands on a phased motor of a test fixture, although other configurations may be employed. An enabling operation 404 enables a clamping circuit of the motor control circuit. In one implementation, the enablement may be achieved by a loss of power to the motor control circuit, although other actions may enable said circuit, including an active signal that opens or closes a switch, etc.

A disconnection operation 406 disconnects the motor control circuit from the spinning phased motor. This disconnection operation 406 may occur at any time the phased motor is spinning, regardless of whether the phased motor is being braked. The spinning phased motor generates back EMF and therefore a discharge current from the windings of the phased motor when one or more taps of the phased motor are disconnected from the motor control circuit. If the centertap connection to the motor control circuit remains even momentarily connected to the phased motor, for example, after a winding tap has been disconnected, the winding can discharge through the centertap to the motor control circuit. A sensing operation 408 senses phase-current-induced flyback voltage at an electrical connection connecting the centertap, the clamping circuit, and driver control electronics. One or more electrostatic discharge cells may also be connected to this electrical connection.

If the phase-current-induced flyback voltage at the clamping circuit exceeds in magnitude a turn-on threshold of the clamping circuit, a triggering operation 410 will turn on the clamping circuit and cause current from one or more discharging windings of the phased motor to flow through the clamping circuit, rather than through the driver control electronics or any electrostatic discharge cells of the motor control circuit.

FIG. 5 illustrates a plan view of an example disc drive 500. The disc drive 500 includes a base 502 to which various components of the disc drive 500 are mounted. A top cover 504, shown partially cut away, cooperates with the base 502 to form an internal, sealed environment for the disc drive in a conventional manner. The components include a spindle motor 506 which rotates one or more storage medium discs 508 at a constant high speed. Information is written to and read from tracks on the discs 508 through the use of an actuator assembly 510, which rotates during a seek operation about a bearing shaft assembly 512 positioned adjacent the discs 508. The actuator assembly 510 includes a plurality of actuator arms 514 which extend towards the discs 508, with one or more flexures 516 extending from each of the actuator arms 514. Mounted at the distal end of each of the flexures 516 is a head 518 which includes an air bearing slider enabling the head 518 to fly in close proximity above the corresponding surface of the associated disc 508. The distance between the head 518 and the storage media surface during flight is referred to as the "fly height".

During a seek operation, the track position of the head 518 is controlled through the use of a voice coil motor (VCM) 524, which typically includes a coil 526 attached to the actuator assembly 510, as well as one or more permanent magnets 528 which establish a magnetic field in which the coil 526 is immersed. The controlled application of current to the coil 526 causes magnetic interaction between the permanent magnets 528 and the coil 526 so that the coil 526 moves in accordance with the well-known Lorentz relationship. As the coil 526 moves, the actuator assembly 510 pivots about the bearing shaft assembly 512, and the heads 518 are caused to move across the surfaces of the discs 508.

The spindle motor 506 is typically de-energized when the disc drive 500 is not in use for extended periods of time. The heads 518 are moved away from portions of the disk 508 containing data when the drive motor is de-energized. The heads 518 are secured over portions of the disk not containing data through the use of an actuator latch arrangement and/or ramp assembly 544, which prevents inadvertent rotation of the actuator assembly 510 when the drive discs 508 are not spinning.

A flex assembly 530 provides the requisite electrical connection paths for the actuator assembly 510 while allowing pivotal movement of the actuator assembly 510 during operation. The flex assembly 530 includes a printed circuit board 534 to which a flex cable 532 connected with the actuator assembly 500 and leading to the head 518 is connected. The flex cable may be routed along the actuator arms 514 and the flexures 516 to the heads 518. The printed circuit board 534 typically includes circuitry for controlling the write currents applied to the heads 518 during a write operation and a preamplifier for amplifying read signals generated by the heads 518 during a read operation. The flex assembly 530 terminates at a flex bracket for communication through the base deck 502 to a disc drive printed circuit board (not shown) mounted to the bottom side of the disc drive 500.

In an exemplary implementation, spindle control circuitry in the disc drive 500 includes a clamping circuit to protect control electronics from discharge current from phased motor windings.

FIG. 6 illustrates the primary functional components of a disc drive incorporating one of the various implementations of the described technology and generally shows the main functional circuits that are resident on the disc drive printed circuit board and used to control the operation of the disc drive. The disc drive is operably connected to a host computer 640 in a conventional manner. Control communication paths are provided between the host computer 640 and a disc drive microprocessor 642, the microprocessor 642 generally providing top level communication and control for the disc drive in conjunction with programming for the microprocessor 642 stored in microprocessor memory (MEM) 643. The MEM 643 can include random access memory (RAM), read only memory (ROM) and other sources of resident memory for the microprocessor 642.

The discs are rotated at a constant high speed by a spindle motor control circuit 648, which typically electrically commutates the spindle motor through the use, typically, of back electromotive force (BEMF) sensing. During a seek operation, wherein an actuator 610 moves heads 618 between tracks on the storage media, the position of the heads 618 is controlled through the application of current to the coil 626 of a voice coil motor. A servo control circuit 650 provides such control. During a seek operation the microprocessor 642 receives information regarding the velocity of the head 618, and uses that information in conjunction with a velocity profile stored in memory 643 to communicate with the servo control circuit 650, which will apply a controlled amount of current to the voice coil motor coil 626, thereby causing the actuator assembly 610 to be pivoted.

Data is transferred between the host computer 640 or other device and the disc drive by way of an interface 644, which typically includes a buffer to facilitate high speed data transfer between the host computer 640 or other device and the disc drive. Data to be written to the disc drive is thus passed from the host computer 640 to the interface 644 and then to a read/write channel 646, which encodes and serializes the data and provides the requisite write current signals to the heads 618. To retrieve data that has been previously stored in the data storage device, read signals are generated by the heads 618 and provided to the read/write channel 646, which performs decoding and error detection and correction operations and outputs the retrieved data to the interface 644 for subsequent transfer to the host computer 640 or other device.

In an exemplary implementation, spindle control 648 in the disc drive includes a clamping circuit to protect control electronics from discharge current from phased motor windings.

Embodiments of the described technology have been discussed herein with reference to a magnetic disc drive. One skilled in the art will recognize that the described technology may also be applied to any data storage device, such as an optical disc drive, a magneto-optical disc drive, or a compact disc drive, having phased motor control. Further, one skilled in the art will understand that various implementations of the described technology are equally applicable to any type of electrical or electronic device capable of controlling a phased motor. For example, devices that may implement embodiments of the present invention include but are not limited to notebook computers, handheld devices such as Personal Digital Assistants (PDAs), cell phones, office equipment such as copiers and fax machines, woodworking and metalworking systems, transit vehicles, automobiles, other transportation systems, etc.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. Motor control circuitry comprising:
   at least one electrostatic discharge cell connected to an electrical connection that connect to a tap of a phased motor;
   a clamping circuit connected to the at least one electrostatic discharge cell via the electrical connection, the clamping circuit having a turn-on threshold lower in magnitude than the turn-on thresholds of the at least one electrostatic discharge cell.

2. The motor control circuitry of claim 1 further comprising:
   driver control electronics that control rotation of the phased motor and are coupled to the electrical connection, the driver control electronics having a breakdown threshold higher in magnitude than the turn-on threshold of the clamping circuit.

3. The motor control circuitry of claim 1 wherein the clamping circuit comprises:
   a diode having a turn-on threshold lower in magnitude than the turn-on thresholds of the at least one electrostatic discharge cell.

4. The motor control circuitry of claim 1 wherein the clamping circuit comprises:
   a transistor having a turn-on threshold lower in magnitude than the turn-on thresholds of the at least one electrostatic discharge cell.

5. The motor control circuitry of claim 1 wherein the clamping circuit comprises:
   a transistor having a body diode with a turn-on threshold lower in magnitude than the turn-on thresholds of the at least one electrostatic discharge cell.

6. The motor control circuitry of claim 1 further comprising:
driver control electronics that control rotation of the phased motor and are coupled to the electrical connection, wherein a multiplicative product of anticipated discharge current and impedance of the clamping circuit is lower in magnitude than the lower of the turn-on thresholds of the at least one electrostatic discharge cell and a breakdown voltage of the driver control electronics.

7. The motor control circuitry of claim 1 wherein the clamping circuit carries discharge current from at least one winding of the phased motor if phase-current-induced flyback voltage on the electrical connection exceeds in magnitude the turn-on threshold of the clamping circuit.

8. The motor control circuitry of claim 1, wherein the tap is a center tap of the phased motor.

9. A method comprising:
connecting an electrical connection to a tap of a phased motor, the electrical connection being further connected to at least one electrostatic discharge cell and driver control electronics that control rotation of the phased motor;
rotating the phased motor via the driver control electronics;
discharging current generated by the rotating phased motor through a clamping circuit, the clamping circuit having a turn-on threshold lower in magnitude than the turn-on thresholds of the at least one electrostatic discharge cell.

10. The method of claim 9 further comprising:
connecting driver control electronics to the electrical connection, wherein the driver control electronics have a breakdown voltage higher in magnitude than the turn-on threshold of the clamping circuit.

11. The method of claim 9 wherein the clamping circuit includes a diode having a turn-on threshold lower in magnitude than the turn-on thresholds of the at least one electrostatic discharge cell.

12. The method of claim 9 wherein the clamping circuit comprises a transistor having a turn-on threshold lower in magnitude than the turn-on thresholds of the at least one electrostatic discharge cell.

13. The method of claim 9 wherein the clamping circuit comprises a transistor having a body diode with a turn-on threshold lower in magnitude than the turn-on thresholds of the at least one electrostatic discharge cell.

14. The method of claim 9 further comprising:
connecting driver control electronics to the electrical connection, wherein a multiplicative product of anticipated discharge current and impedance of the clamping circuit is lower in magnitude than the lower of the turn-on thresholds of the at least one electrostatic discharge cell and a breakdown voltage of the driver control electronics.

15. The method of claim 9 wherein the clamping circuit carries discharge current from at least one winding of the phased motor if phase-current-induced flyback voltage on the electrical connection exceeds in magnitude the turn-on threshold of the clamping circuit.

16. Motor control circuitry comprising:
driver control electronics that control rotation of a phased motor and are connected to an electrical connection adapted to connect to a tap of the phased motor;
a clamping circuit connected to the driver control electronics via the electrical connection, the clamping circuit having a turn-on threshold lower in magnitude than a breakdown voltage of the driver control electronics.

17. The motor control circuitry of claim 16 wherein the clamping circuit comprises:
a diode having a turn-on threshold lower in magnitude than the breakdown voltage of the driver control electronics.

18. The motor control circuitry of claim 16 wherein the clamping circuit comprises:
a transistor having a turn-on threshold lower in magnitude than the breakdown voltage of the driver control electronics.

19. The motor control circuitry of claim 16 wherein the clamping circuit comprises:
a transistor having a body diode with a turn-on threshold lower in magnitude than the breakdown voltage of the driver control electronics.

20. The motor control circuitry of claim 16 wherein a multiplicative product of anticipated discharge current and impedance of the clamping circuit is lower in magnitude than the breakdown voltage of the driver control electronics.

21. The motor control circuitry of claim 16 wherein the clamping circuit carries discharge current from at least one winding of the phased motor if a phase-current-induced flyback voltage on the electrical connection exceeds in magnitude the turn-on threshold of the clamping circuit.

* * * * *